Oct. 30, 1962    G. W. MENZIE    3,060,956
PROPORTIONING APPARATUS
Filed June 10, 1959
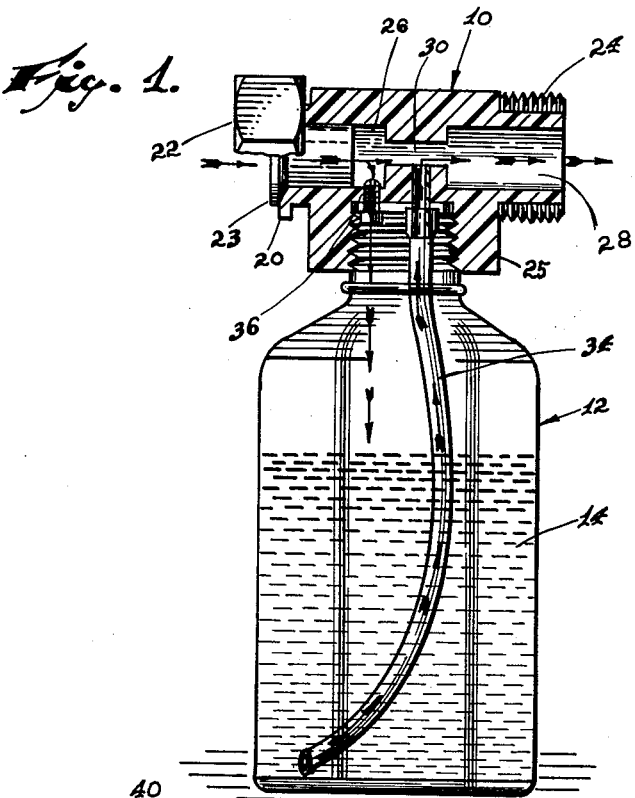
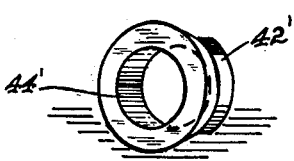
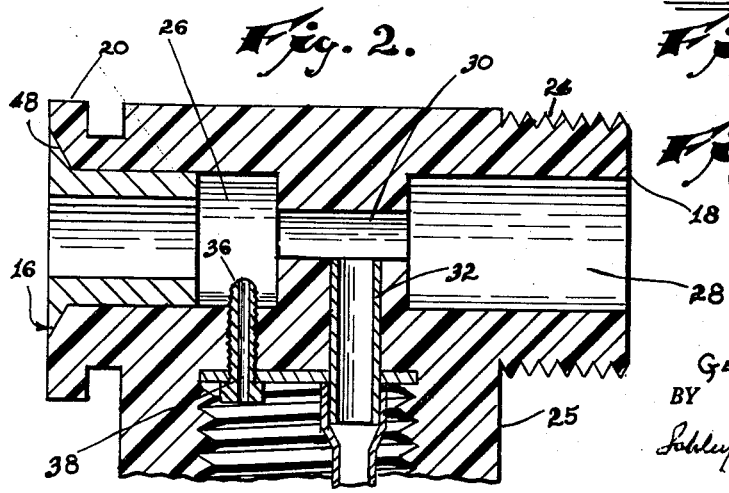
INVENTOR.
GERALD W. MENZIE,
BY
Sobley, Jack & Jenkins
ATTORNEYS.

United States Patent Office 3,060,956
Patented Oct. 30, 1962

3,060,956
PROPORTIONING APPARATUS
Gerald W. Menzie, Indianapolis, Ind., assignor to Lonn Manufacturing Co., Inc., Indianapolis, Ind., a corporation of Indiana
Filed June 10, 1959, Ser. No. 819,414
7 Claims. (Cl. 137—205.5)

This invention relates to a liquid proportioning apparatus, and has for one of its objects the provision of a liquid proportioner which will proportion liquid materials having either greater or lesser specific gravities than the carrier liquid. It is a further object of my invention to provide an inexpensive proportioning apparatus which will accurately proportion and admix a pair of liquids, which will be operative over a wide range of flow rates, which will effect such proportioning over a wide range of values, and which is quickly and easily adjustable to give the desired ratios of the proportioned materials.

In carrying out my invention in its preferred form, there is provided a housing adapted to be connected to a reservoir containing the liquid to be proportioned, said housing being provided with inlet and outlet ports at each of its ends. The inlet and outlet ports are interconnected by a flow passage having a centrally positioned constricted area in communication with said reservoir. Between the constricted area and the inlet port is a pressure chamber which is also in communication with the reservoir by means of a small diameter conduit for by-passing a small quantity of carrier liquid flowing through said housing into the reservoir to force the liquid to be proportioned out of the reservoir into a mixing chamber into the main flow of the carrier liquid for discharge through the outlet port.

The amount of carrier liquid by-passed from the pressure chamber into the reservoir is adjustable to control the amount of liquid leaving the reservoir and thus proportion the same into the carrier liquid. Such control is afforded by means of a set of inserts receivable in the housing inlet and extending into the pressure chamber of the housing. Each of said inserts is provided with a passage for the carrier liquid, with the diameters and/or the lengths of said passages being graduated, for controlling the pressure of the carrier liquid in the pressure chamber with respect to the pressure of the carrier liquid in the constricted area of the housing passage. Thus, by using an insert which will reduce the carrier liquid pressure in the pressure chamber, the rate of flow of the carrier liquid into the reservoir will be reduced to reduce the amount of liquid leaving the reservoir. Conversely, by using an insert which will increase the carrier liquid pressure in the pressure chamber, the rate of flow of the carrier liquid into the reservoir will be increased to increase the amount of liquid leaving the reservoir. In this manner, the liquid in the reservoir to be proportioned is admixed with carrier liquid in the flow passage in the housing in controlled proportional amounts.

The accompanying drawing illustrates my invention. In such drawings:

FIG. 1 is a side elevation in partial section showing a liquid proportioner embodying my invention;

FIG. 2 is an isometric view of the insert shown in FIG. 1;

FIG. 3 is an isometric view of a modified form of the insert shown in FIG. 2; and FIG. 4 is an enlarged section of the proportioner housing shown in FIG. 1.

As illustrated in the drawing, my liquid proportioner comprises a housing 10 adapted to be received on a reservoir 12 holding the liquid 14 to be proportioned. In most operations, the carrier liquid with respect to which the liquid 14 is proportioned and mixed is water under pressure, although any desired carrier liquid may be employed. For purposes of simplicity of description, however, the carrier liquid referred to hereinafter will be water.

As shown in FIG. 4, the housing 10 is provided with inlet and outlet ports 16 and 18 respectively. Adjacent the inlet port 16, the housing 10 has an annularly extending shoulder 20 spaced outwardly from the body of said housing and adapted to receive a coupling 22 having a washer 23 press-fit therein for connecting the housing to a delivery hose, pipe, or the like. Conveniently, the outlet port of the housing is externally threaded, as at 24, for the reception of a discharge hose, pipe, or the like. A boss 25 is formed on the housing 10, and is internally threaded for removably mounting said housing on the reservoir 12.

The inlet and the outlet ports are interconnected by a flow passage having a pressure chamber 26 adjacent the inlet port 16 and a mixing chamber 28 adjacent the outlet port 18. Interposed between the pressure chamber 26 and the mixing chamber 28 is a constricted area 30 having a diameter smaller than the diameters of either of the chambers 26 or 28. Said constricted area 30 is in communication with the reservoir 12 by means of an opening extending through the housing 10 and provided with a conduit 32 upon which a length of tubing 34 may be mounted, said tubing extending downwardly into the reservoir 12 adjacent the bottom thereof. The pressure chamber 26 is also in communication with the reservoir 12 by means of a screw 36 having an opening 38 extending therethrough.

As will be understood, by interposing the constricted area 30 between the larger diameter pressure and mixing chambers 26 and 28, the water passing through the housing from the constricted area to the expanded area of the mixing chamber will have a smaller pressure and higher flow rate in said constricted area as compared to the pressure chamber. Thus, the water flowing through the constricted area will have a slight aspirating effect tending to pull the liquid 14 out of the reservoir through the tubing 34. However, this aspirating action is substantially negligible, and the main force for moving the liquid 14 out of the reservoir is developed by the water moving through the pressure chamber 26. Due to the water having a higher pressure in the pressure chamber 26 than in the constricted area 30, some of the water in said chamber will be by-passed out of the general flow through the housing into the reservoir through the screw opening 38. The water moving downwardly through the screw into the reservoir creates a pressure on the liquid 14 to force said liquid upwardly through the tubing 34 into the constricted area 30 where it will be admixed with the general flow of water in the mixing chamber 28.

In order to proportion the liquid 14 with the water flowing through the housing, it is necessary to control the amount of water flowing into the reservoir 12 through the opening in the screw 36. Such control is effected by controlling the water pressure in the pressure chamber 26 with respect to the water pressure in the constricted area 30. The closer that the water pressure in the pressure chamber 26 approaches the pressure in the constricted area 30, the less will be the amount of water entering the reservoir 12 through the screw opening 38, and the smaller will be the proportion of liquid 14 mixed with the water passing through the housing.

To control the water pressure in the chamber 26 and thereby proportion the liquid 14 admixed with said water, I provide a plurality of inserts 40 receivable in the pressure chamber 26. As illustrated in FIGS. 2 and 3, each of the inserts 40 comprises a shank 42 having an axially extending opening 44 formed therein and extending therethrough. An annularly extending flange 46 projects outwardly from one end of the shank and is adapted to seat against the edge of the inlet port 16. Conveniently, the edge of the inlet port 16 is beveled, as at 48, to provide a seat for the flange 46. Thus, the shank 42 is insertable into the housing 10 through the inlet port 16 with its sidewalls being supported against the sidewalls of the pressure chamber 26 and its flange 46 being releasably held against the beveled edge 48 of said port by the washer 23 in the hose coupling 22.

The length of the insert shanks 42 and/or the diameter of the openings 44 formed in said shanks control the rate of flow of the water in the pressure chamber 26 and thus also control the pressure of the water in said chamber. An insert 40 having a relatively long shank 42, such as the insert illustrated in FIG. 2, occupies most of the pressure chamber 26 so that its opening 44 through which the water must pass directs the flow of water toward the constricted area 30. This guiding of the carrier liquid coupled with the diameter of the opening 44 being less than the diameter of the pressure chamber 26 causes the water moving through said pressure chamber 26 to move through said chamber at an increased flow rate and to be at a lower pressure within said chamber without substantially affecting the flow rate and pressure of the water in the constricted area 30 or the overall rate of flow of the main flow of the water from the inlet port 16 to the outlet port 18. This reduced water pressure in the pressure chamber reduces the amount of water by-passed from said pressure chamber through the screw opening 38 into the reservoir 12, and thereby reduces the amount of liquid 14 leaving said reservoir. Conversely, as the length of the shank of the insert is decreased, the length of the opening 44 is decreased so that the amount of guiding of the water is reduced and the water moving through the pressure chamber 26 will have a lower flow rate and a higher pressure, thus causing an increased amount of water to flow into the reservoir through the screw opening 38 and thereby increase the amount of water leaving the reservoir.

The water pressure in the pressure chamber 26 may also be controlled by using inserts having openings of graduated diameters. The insert shown in FIG. 3 illustrates an insert having an opening 44' of relatively large diameter, but provided with a relatively short shank 42'. By using inserts with openings of decreasing diameters, the effectiveness of the guiding action of said openings will be increased to cause the rate of the flow of the water moving through the pressure chamber to be increased with the result that the water pressure in the chamber 26 will be decreased to reduce the amount of liquid 14 forced out of the reservoir, and vice versa. As with the inserts of different lengths, the use of inserts having different diameter openings 44' produces differences in the pressure of the water in the chamber 26 without substantially affecting the overall rate of flow of the main flow of the water from the inlet port 16 to the outlet port 18.

Thus, it is possible to quickly and easily control the pressure in the chamber 26 to control the proportioning of the liquid 14 by using a set of inserts graduated with respect to the length and/or diameter of the openings in the insert shanks.

My invention is illustrated in FIG. 1 for proportioning a liquid 14 having a greater specific gravity than water. When it is desired to proportion a liquid which has a smaller specific gravity than water, it is merely necessary to connect the tubing 34 to the screw 36 so that the water moves from the chamber 26 through the screw opening 38 and the tubing 34 to the bottom of the reservoir 12 and pushes the liquid to be proportioned out of the reservoir through the conduit 32. Irrespective of whether the liquid to be proportioned is heavier or lighter than water, the water entering the reservoir through the screw opening 38 does not tend to exit said reservoir or mix with the liquid 14 in the reservoir, since the water entering the reservoir through said screw enters at a flow rate too low to produce any appreciable amount of turbulence or intermixing of said water with the liquid 14 in the reservoir 12.

My device may also be used to proportion liquids which are readily soluble in water, or which have a specific gravity approximating that of water, wherein an intermixing of the liquid 14 and the carrier water takes place in the reservoir in spite of the absence of any appreciable turbulences in said reservoir. In such systems, the water still enters the reservoir at a constant controlled rate, but the concentration of the liquid 14 is progressively decreased by its dilution with the water to give a uniform, constantly decreasing ratio of the liquid 14 to the water discharged from the reservoir. An example of the use of such a proportioning system is the administration of a given quantity of vitamins over a given period of time into livestock drinking water, whereby both the beginning concentration and the substantially gradually reduced concentration of the vitamins produce, in total, the desired beneficial results.

I claim as my invention:

1. A liquid proportioning apparatus for proportioning a liquid material into a carrier liquid, comprising a reservoir for holding the liquid to be proportioned, a housing mounted on said reservoir and having inlet and outlet ports, a flow passage for the carrier liquid interconnecting said ports, said flow passage having a constricted area interposed between a pressure chamber and a mixing chamber, a pair of passages interconnecting said pressure chamber and constricted area to the reservoir, and means inserted in the pressure chamber between said inlet port and the passage between said pressure chamber and reservoir to adjust the flow rate of the carrier liquid moving into the reservoir from the pressure chamber and thereby control the amount of the liquid to be proportioned exiting the reservoir to the constricted area for discharge into the mixing chamber without substantially changing the overall main flow rate of the carrier liquid from said inlet port to said outlet port.

2. The invention as set forth in claim 1 in which said pressure and mixing chambers have larger diameters than said restricted area, and said pressure chamber is interposed between the constricted area and the inlet port.

3. The invention set forth in claim 1 in which the passage between the pressure chamber and the reservoir has a substantially smaller diameter than the passage between the constricted area and the reservoir, and one of said pair of passages terminates adjacent the bottom of the reservoir and the other of said pair of passages terminates adjacent the top of the reservoir.

4. A liquid proportioning apparatus for proportioning a liquid material into a carrier liquid, comprising a reservoir for holding the liquid to be proportioned, a housing mounted on said reservoir and having inlet and outlet ports, means on said housing for connecting a carrier liquid hose to the inlet port, a flow passage interconnecting said ports, said flow passage having a constricted area interposed between a pressure chamber and a mixing chamber, a pair of passages interconnecting said pressure chamber and constricted area to the reservoir, and means removably held in said pressure chamber by said first mentioned means between said first mentioned means and the passage interconnecting the pressure chamber and reservoir to adjust the flow rate of the carrier liquid moving into the reservoir from the pressure chamber and thereby control the amount of the liquid to be proportioned exiting the reservoir to the constricted area for discharge into the mixing chamber without substantially changing the overall main flow rate of the carrier liquid from said inlet port to said outlet port.

5. A liquid proportioning apparatus as set forth in claim 4 in which said means in said pressure chamber comprises an insert having an axially extending opening fitted into said pressure chamber and which may be substituted for inserts of a plurality of different lengths for changing the pressure of the carrier liquid moving through the pressure chamber relative to the pressure of the carrier liquid moving through said constricted area.

6. A liquid proportioning apparatus as set forth in claim 4 in which said means in said pressure chamber comprises an insert having an axially extending opening fitted into said pressure chamber and which may be substituted for inserts having openings of a plurality of different diameters for changing the pressure of the carrier liquid moving through the pressure chamber relative to the pressure of the carrier liquid moving through said constricted area.

7. A liquid proportioning apparatus as set forth in claim 4 in which said means in said pressure chamber comprises an insert having an axially extending opening fitted into said pressure chamber and which may be substituted for inserts of a plurality of different lengths and openings of a plurality of different diameters for changing the pressure of the carrier liquid moving through said pressure chamber relative to the pressure of the carrier liquid moving through said constricted area.

References Cited in the file of this patent
UNITED STATES PATENTS

| | | |
|---|---|---|
| 2,058,901 | McPherson | Oct. 27, 1936 |
| 2,125,573 | Kelley | Aug. 2, 1938 |
| 2,789,010 | Dean | Apr. 16, 1957 |
| 2,856,234 | McNair | Oct. 14, 1958 |
| 2,931,580 | Johnson | Apr. 5, 1960 |